United States Patent
Webb et al.

(10) Patent No.: US 12,261,422 B2
(45) Date of Patent: Mar. 25, 2025

(54) TERMINATION ARRANGEMENT FOR AN OVERHEAD ELECTRICAL CABLE INCLUDING A TENSILE STRAIN SHEATH

(71) Applicant: CTC Global Corporation, Irvine, CA (US)

(72) Inventors: William Webb, Laguna Niguel, CA (US); Christopher Wong, Santa Ana, CA (US)

(73) Assignee: CTC Global Corporation, Irvine, CA (US)

( * ) Notice: Subject to any disclaimer, the term of this patent is extended or adjusted under 35 U.S.C. 154(b) by 0 days.

(21) Appl. No.: 17/925,205

(22) PCT Filed: May 20, 2021

(86) PCT No.: PCT/US2021/033499
§ 371 (c)(1),
(2) Date: Nov. 14, 2022

(87) PCT Pub. No.: WO2021/232027
PCT Pub. Date: Nov. 18, 2021

(65) Prior Publication Data
US 2023/0231370 A1    Jul. 20, 2023

Related U.S. Application Data

(60) Provisional application No. 62/704,516, filed on May 14, 2020.

(51) Int. Cl.
*H01R 4/20* (2006.01)
*H01B 7/20* (2006.01)
(Continued)

(52) U.S. Cl.
CPC .............. *H02G 15/06* (2013.01); *H01B 7/207* (2013.01); *H01R 11/12* (2013.01)

(58) Field of Classification Search
CPC . H01R 4/20; H01R 4/62; H01R 4/203; H01R 11/09; H01R 11/12; H01R 43/048; H01R 43/20; H01B 7/207; H01B 11/12
(Continued)

(56) References Cited

U.S. PATENT DOCUMENTS 3,384,704 A    5/1968   Vockroth
6,805,596 B2 * 10/2004  Quesnel ................ H01R 11/09
                                                        29/862

(Continued)

FOREIGN PATENT DOCUMENTS

CL    2020001952 A1    12/2020
CN     105075017 A    11/2015
(Continued)

OTHER PUBLICATIONS

PCT International Search Report and Written Opinion of the International Searching Authority dated Sep. 17, 2021 for PCT Application No. PCT/US2021/033499.
(Continued)

*Primary Examiner* — William H. Mayo, III
(74) *Attorney, Agent, or Firm* — David F. Dockery; The Navitas Intellectual Propery Group LLC

(57) ABSTRACT

A termination arrangement for securing an overhead electrical cable and a method for securing an overhead electrical cable. The termination arrangement includes a longitudinally-extending sheath having a high tensile modulus that is configured to receive a strength member of the overhead electrical cable therein.

26 Claims, 12 Drawing Sheets

(51) Int. Cl.
  *H01R 11/12* (2006.01)
  *H02G 15/06* (2006.01)

(58) Field of Classification Search
  USPC .............................................. 174/74 R–94 R
  See application file for complete search history.

(56) References Cited

U.S. PATENT DOCUMENTS

| | | | | |
|---|---|---|---|---|
| 7,348,489 | B2* | 3/2008 | Chadbourne | H02G 15/18 |
| | | | | 174/84 C |
| 7,575,485 | B2* | 8/2009 | Waltz | H02G 7/056 |
| | | | | 439/783 |
| 9,166,303 | B2 | 10/2015 | Khansa et al. | |
| 9,397,461 | B2* | 7/2016 | De France | H01R 11/12 |
| 9,748,670 | B1* | 8/2017 | Quesnel | H01R 4/203 |
| 10,931,091 | B2* | 2/2021 | Chan | H01R 4/62 |
| 2003/0194916 | A1* | 10/2003 | Quesnel | H01R 11/09 |
| | | | | 439/784 |
| 2010/0190389 | A1* | 7/2010 | DeFrance | H02G 15/02 |
| | | | | 439/877 |
| 2012/0305312 | A1* | 12/2012 | McCullough | H01R 4/203 |
| | | | | 29/862 |
| 2015/0075837 | A1* | 3/2015 | Welborn | H01R 43/20 |
| | | | | 29/882 |
| 2017/0288383 | A1 | 10/2017 | Quesnel | |

FOREIGN PATENT DOCUMENTS

| | | |
|---|---|---|
| RU | 2537967 C2 | 1/2015 |
| WO | 2014130609 A1 | 8/2014 |
| WO | 2015170389 A1 | 11/2015 |
| WO | 2019147838 A1 | 8/2019 |

OTHER PUBLICATIONS

Office Action dated Feb. 9, 2023 for Eurasian Patent Application No. 202293321.
Office Action dated Jun. 11, 2023 for Saudi Arabian Patent Application No. 522441291.
Office Action dated Jun. 15, 2023 for Egyptian Patent Application No. EG/P/2022/1668.
Office Action dated Mar. 17, 2023 for Vietnamese Patent Application No. 1-2022-08179.
Office Action dated Apr. 25, 2024 for Canadian Patent Application No. 3,178,666.
Office Action dated Apr. 30, 2024 for African Regional Intellectual Property Organization (ARIPO) Patent Application No. AP/P/2022/014562.
Extended European Search Report dated Jan. 25, 2024 for European Patent Application No. 21803289.4.
Office Action dated Aug. 6, 2024 for Egyptian Patent Application No. EGP20221668.
Office Action dated Jul. 26, 2024 for Chilean Patent Application No. 3172-2022.

\* cited by examiner

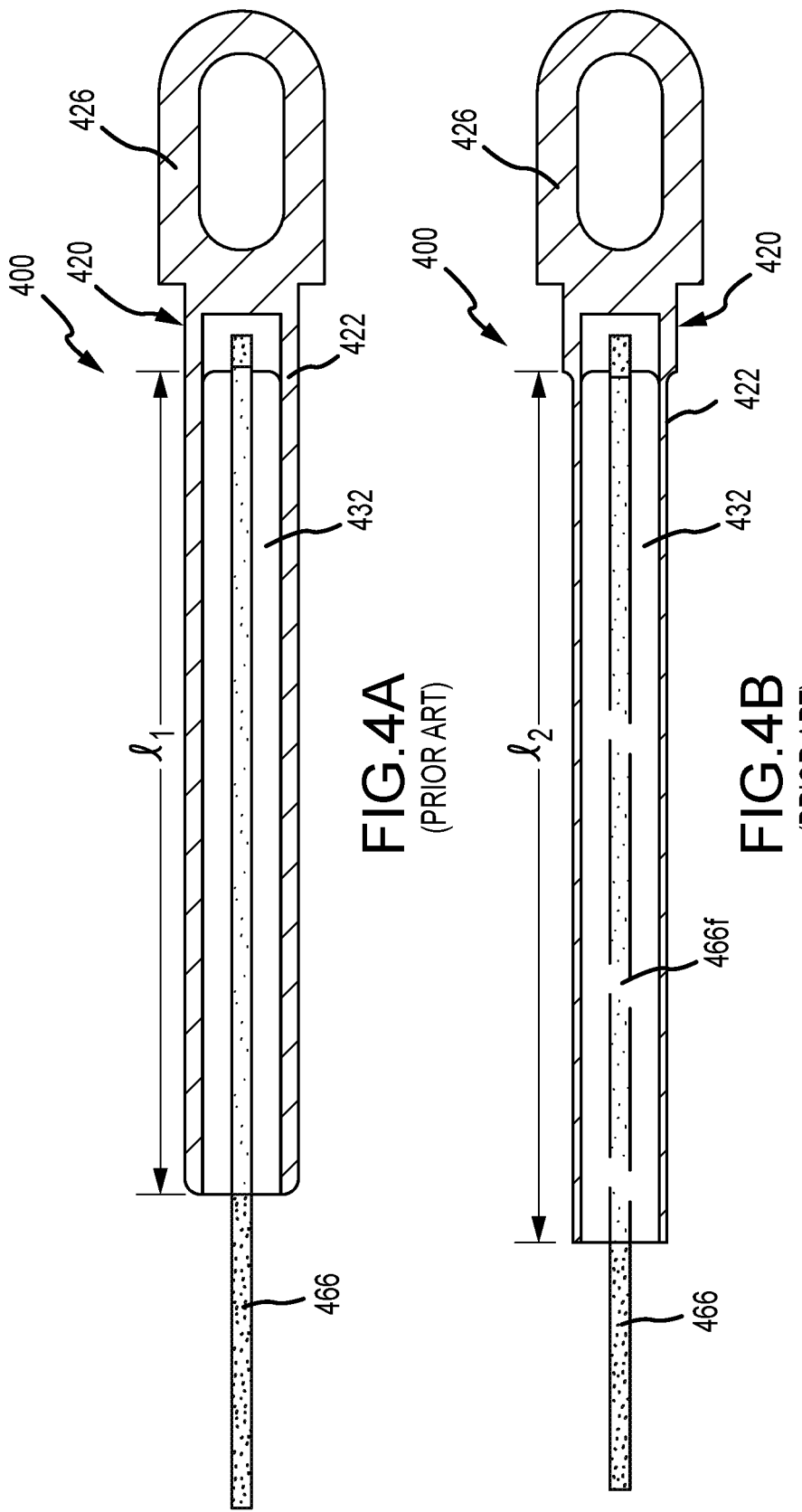

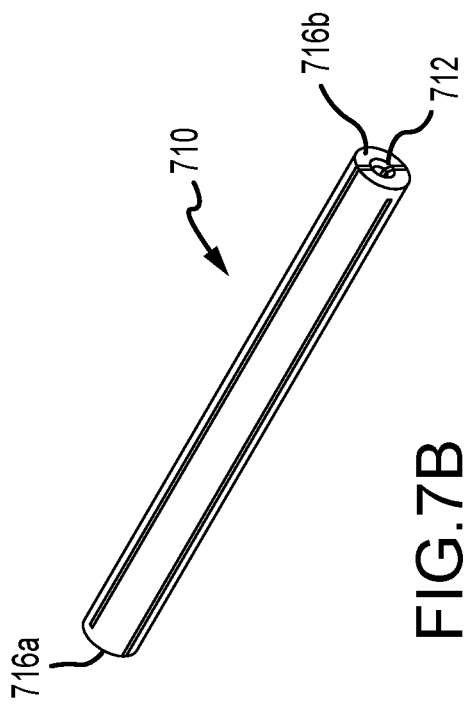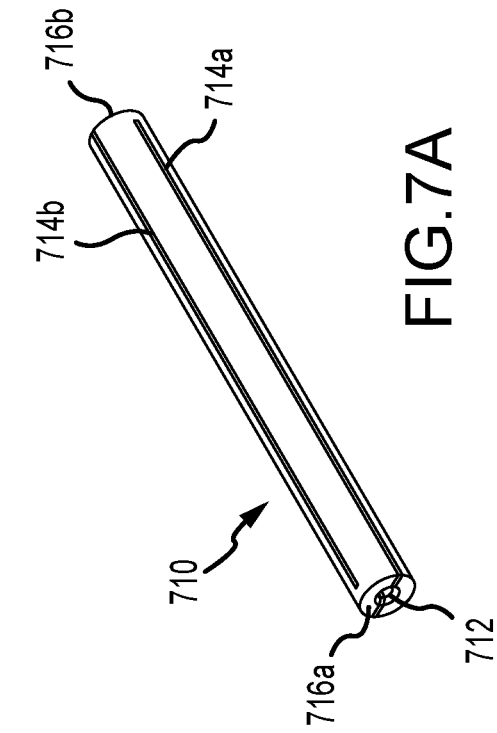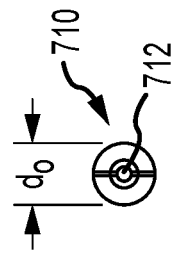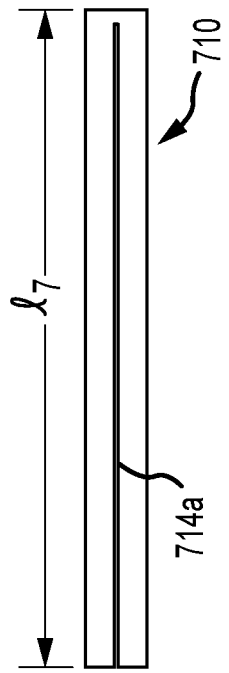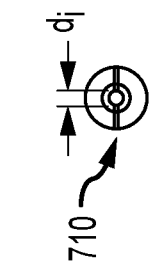

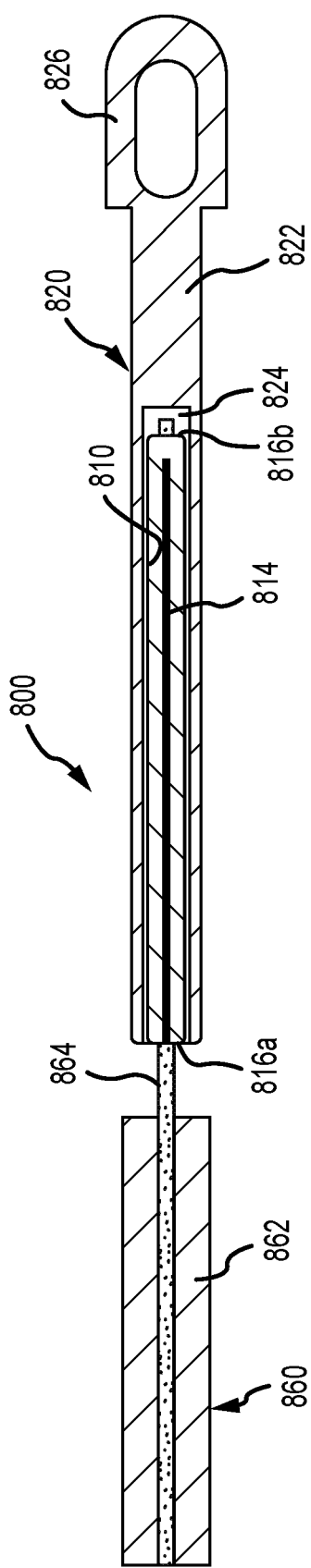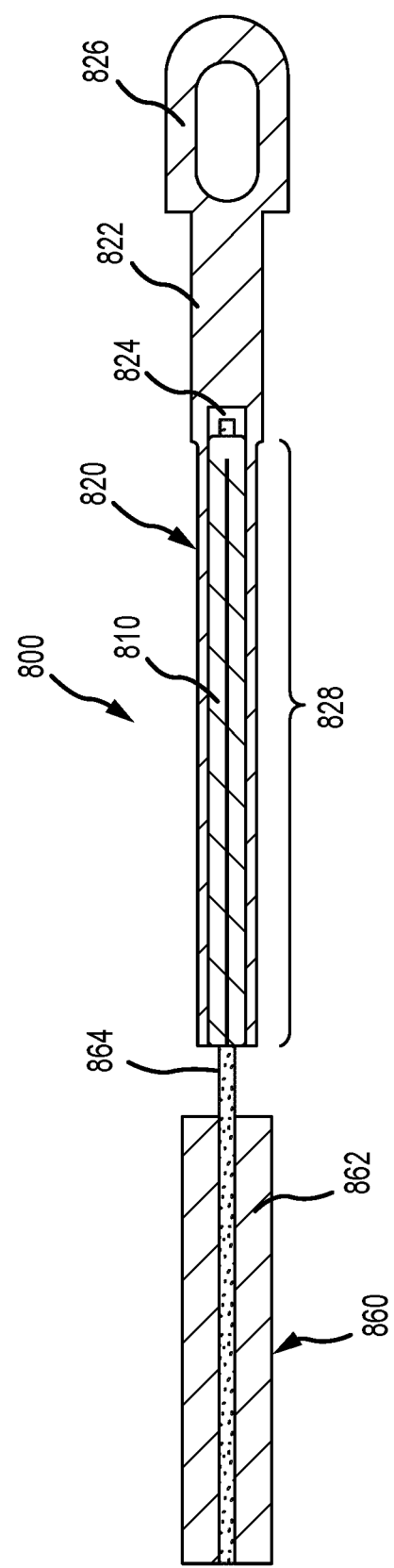

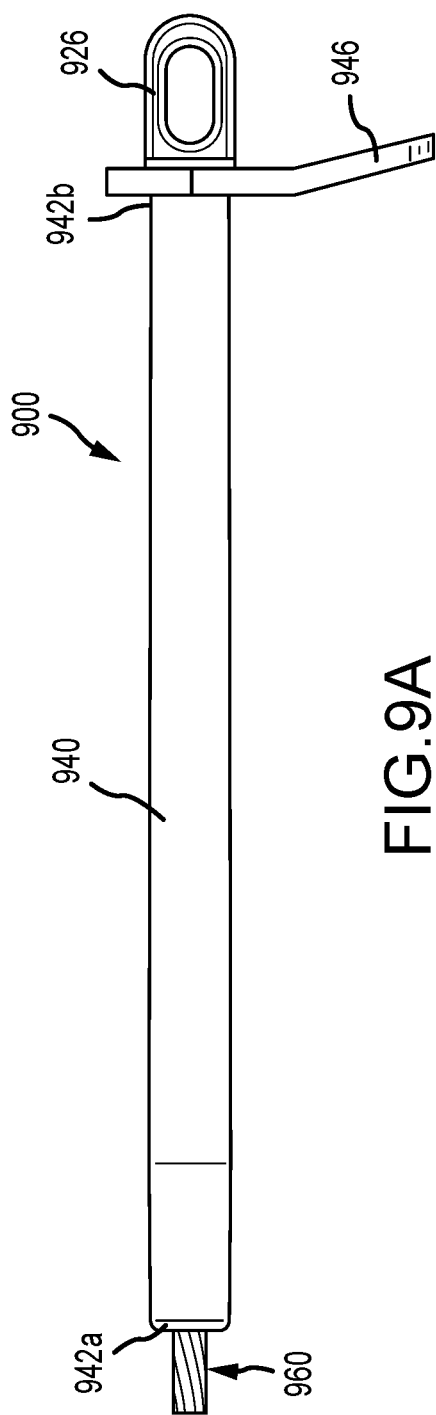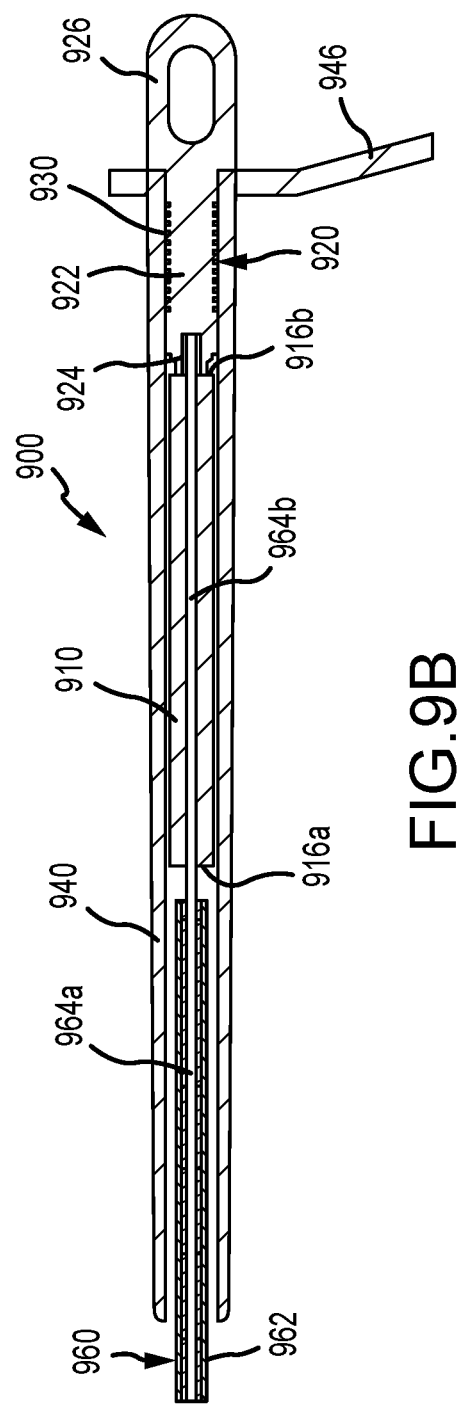

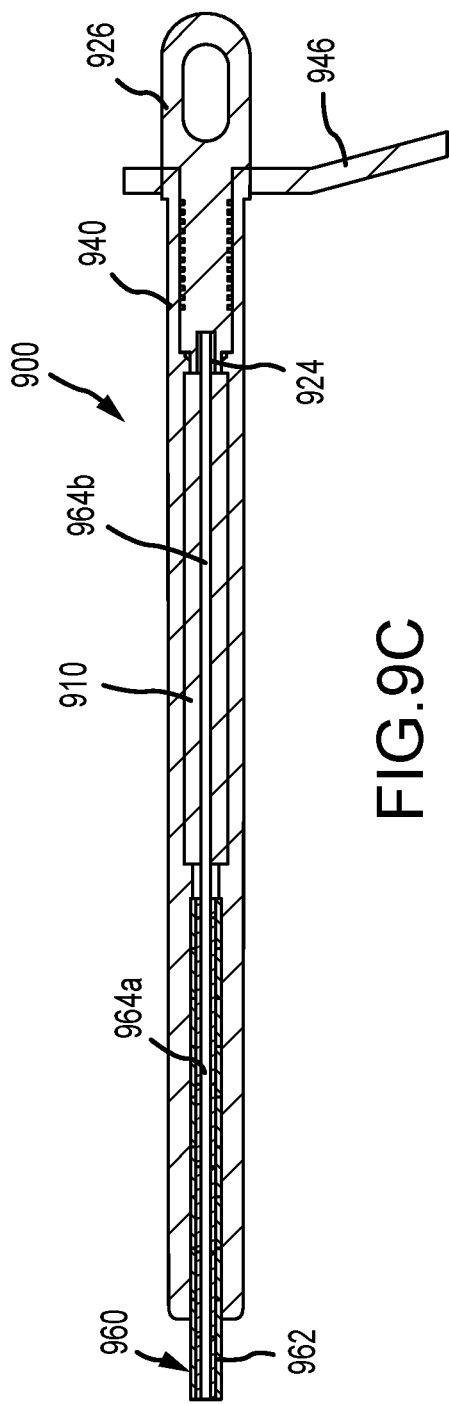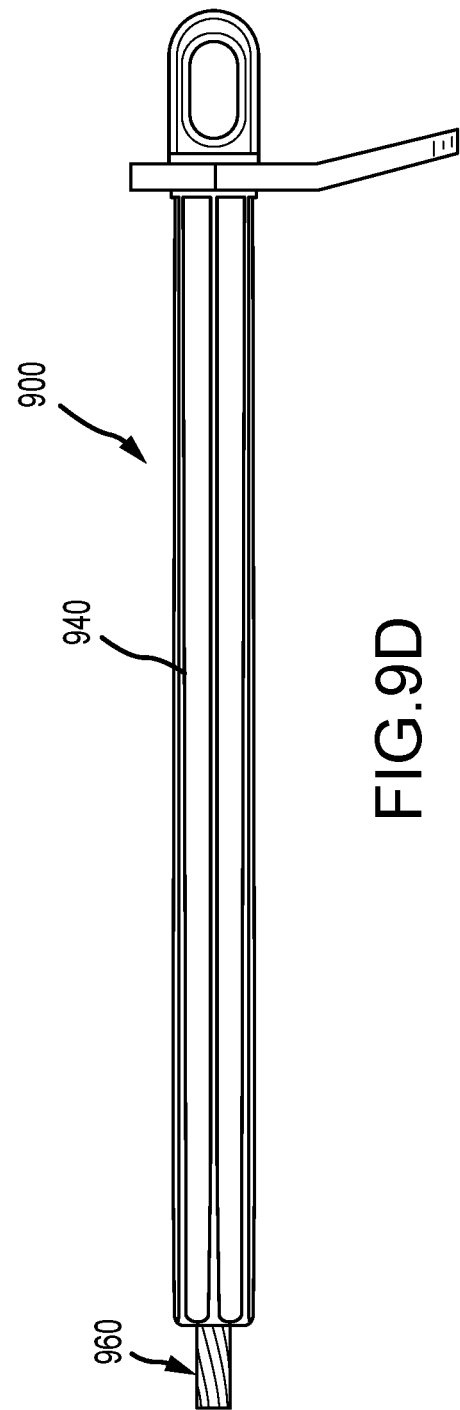

TERMINATION ARRANGEMENT FOR AN OVERHEAD ELECTRICAL CABLE INCLUDING A TENSILE STRAIN SHEATH

CROSS-REFERENCE TO RELATED APPLICATIONS

This application claims the priority benefit of U.S. Provisional Patent Application No. 62/704,516 by Webb et al. and filed on May 14, 2020, which is incorporated herein by reference in its entirety.

FIELD

This disclosure relates to the field of termination arrangements, including dead ends and splices, for use with overhead electrical cables having composite strength members.

SUMMARY

In one embodiment a termination arrangement is disclosed. The termination arrangement is configured for securing an overhead electrical cable comprising a strength member and an electrical conductor disposed around the strength member. The termination arrangement includes: a connector comprising a fastener disposed at a first end of the connector and a connector body extending from the fastener toward an end of the connector that lies opposite the fastener; a longitudinally-extending sheath having a central bore extending therethrough that is configured to receive a strength member within the central bore; and a conductive sleeve configured to be disposed over: (i) an end of the electrical cable, (ii) the sheath, and (iii) at least a portion of the connector body when the termination arrangement is operatively assembled.

In another embodiment, a termination arrangement that is secured to an overhead electrical cable comprising a strength member and an electrical conductor disposed around the strength member is disclosed. The termination arrangement includes: a connector comprising a fastener disposed at a first end of the connector and a connector body extending from the fastener toward an end of the connector that lies opposite the fastener; a longitudinally-extending sheath having a central bore extending therethrough that is operatively disposed over and compressed onto a portion of the strength member to operatively grip the strength member; and a conductive sleeve that is disposed over (i) an end of the electrical cable, (ii) the sheath, and (iii) at least a portion of the connector body. The sheath is operatively attached to the connector body by one of (i) being disposed within a chamber in the connector body and having the connector body crimped onto the sheath, or (ii) being disposed within the conductive sleeve and having the conductive sleeve crimped onto the sheath.

In another embodiment, a method for the termination of an overhead electrical cable including a strength member and an electrical conductor disposed around the strength member is disclosed. The method includes the steps of comprising the steps of: removing the electrical conductor from a termination end of the electrical cable to expose an end portion of the strength member; placing the exposed end portion of the strength member through a central bore disposed within a longitudinally extending sheath; operatively attaching the sheath to a connector, the connector comprising a fastener disposed at a first end of the connector and a connector body extending from the fastener toward an end of the connector that lies opposite the fastener, the attaching comprising one of (i) disposing the sheath within a chamber in the connector body and crimping the connector body onto the steel sheath, or disposing the sheath within a conduit of a conductive sleeve and crimping the conductive sleeve onto the sheath.

DESCRIPTION OF THE DRAWINGS

FIGS. 4A and 4B illustrate a partial cross-section of a termination arrangement for an overhead electrical cable having a composite strength member according to the prior art.

FIGS. 7A to 7E illustrate an embodiment of a steel sheath according to the present disclosure.

FIGS. 8A to 8D illustrate an embodiment of a termination arrangement according to the present disclosure.

FIGS. 9A to 9D illustrate an embodiment of a termination arrangement according to the present disclosure.

DESCRIPTION OF THE EMBODIMENTS

Overhead electrical transmission and distribution lines are constructed by elevating electrical cables (e.g., bare, non-insulated electrical cables) above the terrain using support towers (e.g., pylons). The transmission and distribution lines may span many miles, requiring extremely long lengths of electrical cable and many support towers. Some of the support towers are referred to as dead-end towers or anchor towers, and are placed at termination points, e.g., power substations or locations where the electrical line is routed underground. Dead-end towers may also be required where the electrical line changes direction (e.g., makes a turn), or at regular intervals in a long, straight line path. Another type of termination arrangement is a splice, which is used to make a mechanical and electrical connection between the ends of two adjacent electrical cables in an electrical line.

Overhead electrical cables have traditionally been constructed using an inner steel strength member surrounded by a plurality of conductive aluminum strands that are helically wrapped around the steel strength member, a configuration referred to as "aluminum conductor steel reinforced" (ACSR). Recently, overhead electrical cables having a fiber-reinforced composite strength member have been manufactured and deployed in many electrical lines. As compared to steel, the fiber-reinforced composite materials used for the strength member have a lighter weight, lower thermal expansion and higher specific stiffness. However, fiber-reinforced materials do not reach a yield point where plastic deformation occurs when the materials are stressed.

Figure 1A:
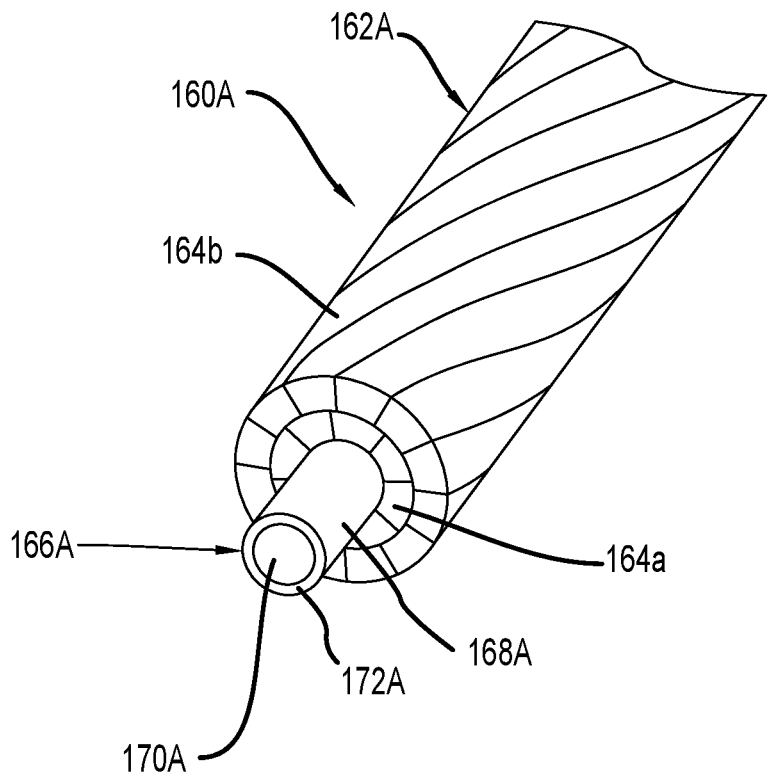
FIGS. 1A and 1B illustrate two examples of an overhead electrical cable having a composite strength member according to the prior art.
Figure 1B:
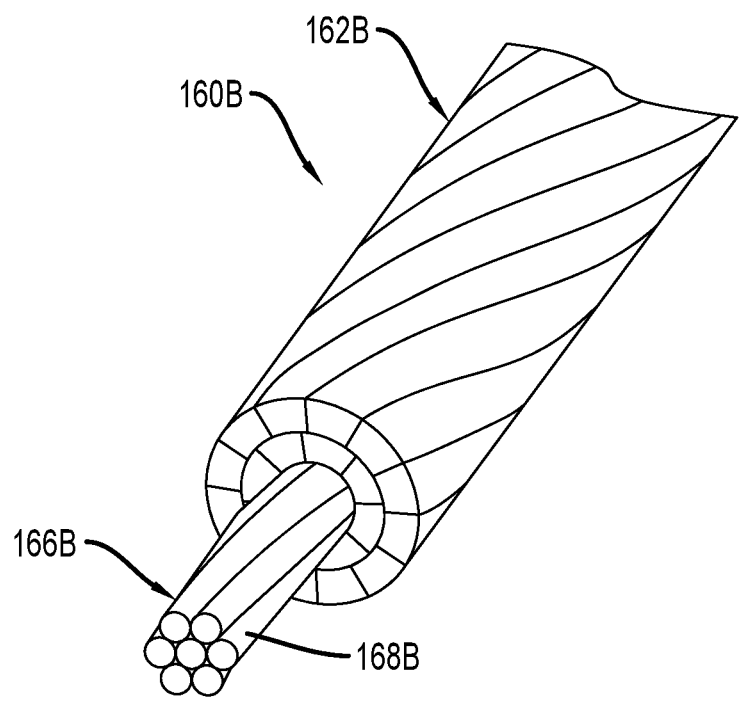

Such fiber-reinforced composite strength members may include a single fiber-reinforced composite strength element (e.g., a single rod) as illustrated in FIG. 1A. An example of such a configuration is disclosed in U.S. Pat. No. 7,368,162 by Hiel et al., which is incorporated herein by reference in it is entirety. Alternatively, the composite strength member may be comprised of a plurality of individual fiber-reinforced composite strength elements (e.g., individual rods) that are operatively combined (e.g., twisted or stranded together) to form the strength member, as is illustrated in FIG. 1B. Examples of such multi-element composite strength members include, but are not limited to: the multi-element aluminum matrix composite strength member illustrated in U.S. Pat. No. 6,245,425 by McCullough et al.; the multi-element carbon fiber strength member illustrated in U.S. Pat. No. 6,015,953 by Tosaka et al.; and the multi-element strength member illustrated in U.S. Pat. No. 9,685, 257 by Daniel et al. Each of these U.S. patents is incorporated herein by reference in its entirety. Other configurations for the fiber-reinforced composite strength member may be implemented as is known to those skilled in the art.

Referring to the overhead electrical cable illustrated in FIG. 1A, the cable 160A includes an electrical conductor 162A that includes a first conductive layer 164a and a second conductive layer 164b, each comprising a plurality of individual conductive strands that are helically wrapped around a fiber-reinforced composite strength member 166A. It will be appreciated that such overhead electrical cables may include a single conductive layer, or more than two conductive layers, depending upon the desired use of the overhead electrical cable. The conductive strands may be fabricated from conductive metals such as copper or aluminum, and for use in bare overhead electrical cables are typically fabricated from aluminum, e.g., hardened aluminum, annealed aluminum, and/or aluminum alloys. As illustrated in FIG. 1A, the conductive strands have a substantially trapezoidal cross-section, although other configurations may be employed, such as circular cross-sections. The use of polygonal cross-sections such as the trapezoidal cross-section advantageously increases the cross-sectional area of conductive metal for the same effective cable diameter, e.g., as compared to strands having a circular cross-section.

The conductive materials, e.g., aluminum, do not have sufficient mechanical properties (e.g., sufficient tensile strength) to be self-supporting when strung between support towers to form an overhead electrical line for transmission and/or distribution of electricity. Therefore, the overhead electrical cable 160A includes the strength member 166A to support the conductive layers 164a/164b when the overhead electrical cable 160A is strung between the support towers under high mechanical tension. In the embodiment illustrated in FIG. 1A, the strength member 166A includes a single (e.g., only one) strength element 168A. The strength element 168A includes a core 170A of high strength carbon reinforcing fibers in a binding matrix and a galvanic layer 172A, e.g., comprised of glass fibers, to prevent contact between the carbon fibers and the first conductive layer 164A, which may lead to corrosion of the aluminum.

FIG. 1B illustrates an embodiment of an overhead electrical cable 160B that is similar to the electrical cable illustrated in FIG. 1A, wherein the strength member 166B comprises a plurality of individual strength elements (e.g., strength element 168B) that are stranded or twisted together to form the strength member 166B. Although illustrated in FIG. 1B as including seven individual strength elements, it will be appreciated that a multi-element strength member may include any number of strength elements that is suitable for a particular application.

As noted above, the fiber-reinforced composite material from which the strength elements are constructed may include reinforcing fibers that are operatively disposed in a binding matrix. The reinforcing fibers may be substantially continuous reinforcing fibers that extend along the length of the fiber-reinforced composite, and/or may be short reinforcing fibers (e.g., fiber whiskers or chopped fibers) that are dispersed through the binding matrix. The reinforcing fibers may be selected from a wide range of materials including, but not limited to, carbon, glass, boron, metal oxides, metal carbides, high-strength polymers such as aramid fibers or fluoropolymer fibers, basalt fibers and the like. Carbon fibers are particularly advantageous in many applications due to their very high tensile strength, and/or due to their relatively low coefficient of thermal expansion (CTE).

The binding matrix may include, for example, a plastic (e.g., polymer) such as a thermoplastic polymer or a thermoset polymer. For example, the binding matrix may include a thermoplastic polymer, including semi-crystalline thermoplastics. Specific examples of useful thermoplastics include, but are not limited to, polyether ether ketone (PEEK), polypropylene (PP), polyphenylene sulfide (PPS), polyetherimide (PEI), liquid crystal polymer (LCP), polyoxymethylene (POM, or acetal), polyamide (PA, or nylon), polyethylene (PE), fluoropolymers and thermoplastic polyesters.

The binding matrix may also include a thermosetting polymer. Examples of useful thermosetting polymers include, but are not limited to, benzoxazine, thermosetting polyimides (PI), polyether amide resin (PEAR), phenolic resins, epoxy-based vinyl ester resins, polycyanate resins and cyanate ester resins. In one exemplary embodiment, a vinyl ester resin is used in the binding matrix. Another embodiment includes the use of an epoxy resin, such as an epoxy resin that is a reaction product of epichlorohydrin and bisphenol A, bisphenol A diglycidyl ether (DGEBA). Curing agents (e.g., hardeners) for epoxy resins may be selected according to the desired properties of the fiber-reinforced composite strength member and the processing method. For example, curing agents may be selected from aliphatic polyamines, polyamides and modified versions of these compounds. Anhydrides and isocyanates may also be used as curing agents. Other examples of polymeric materials useful for a binding matrix may include addition cured phenolic resins, e.g., bismaleimides (BMI), polyetheramides, various anhydrides, or imides.

The binding matrix may also be a metallic matrix, such as an aluminum matrix. One example of an aluminum matrix fiber-reinforced composite is illustrated in U.S. Pat. No. 6,245,425 by McCullough et al., noted above.

One configuration of a composite strength member for an overhead electrical cable that is particularly advantageous is the ACCC® composite configuration that is available from CTC Global Corporation of Irvine, Calif. and is illustrated in U.S. Pat. No. 7,368,162 by Hiel et al., noted above. In the commercial embodiment of the ACCC® electrical cable, the strength member is a single element strength member of substantially circular cross-section that includes an inner core of substantially continuous reinforcing carbon fibers disposed in a polymer matrix. The core of carbon fibers is surrounded by a robust insulating layer of glass fibers that are also disposed in a polymer matrix and insulate the carbon fibers from the surrounding conductive aluminum strands. See FIG. 1A. The glass fibers also have a higher compressive strain capability than the carbon fibers and provide bendability so that the strength member and the electrical cable can be wrapped upon a spool for storage and transportation.

Figure 2:
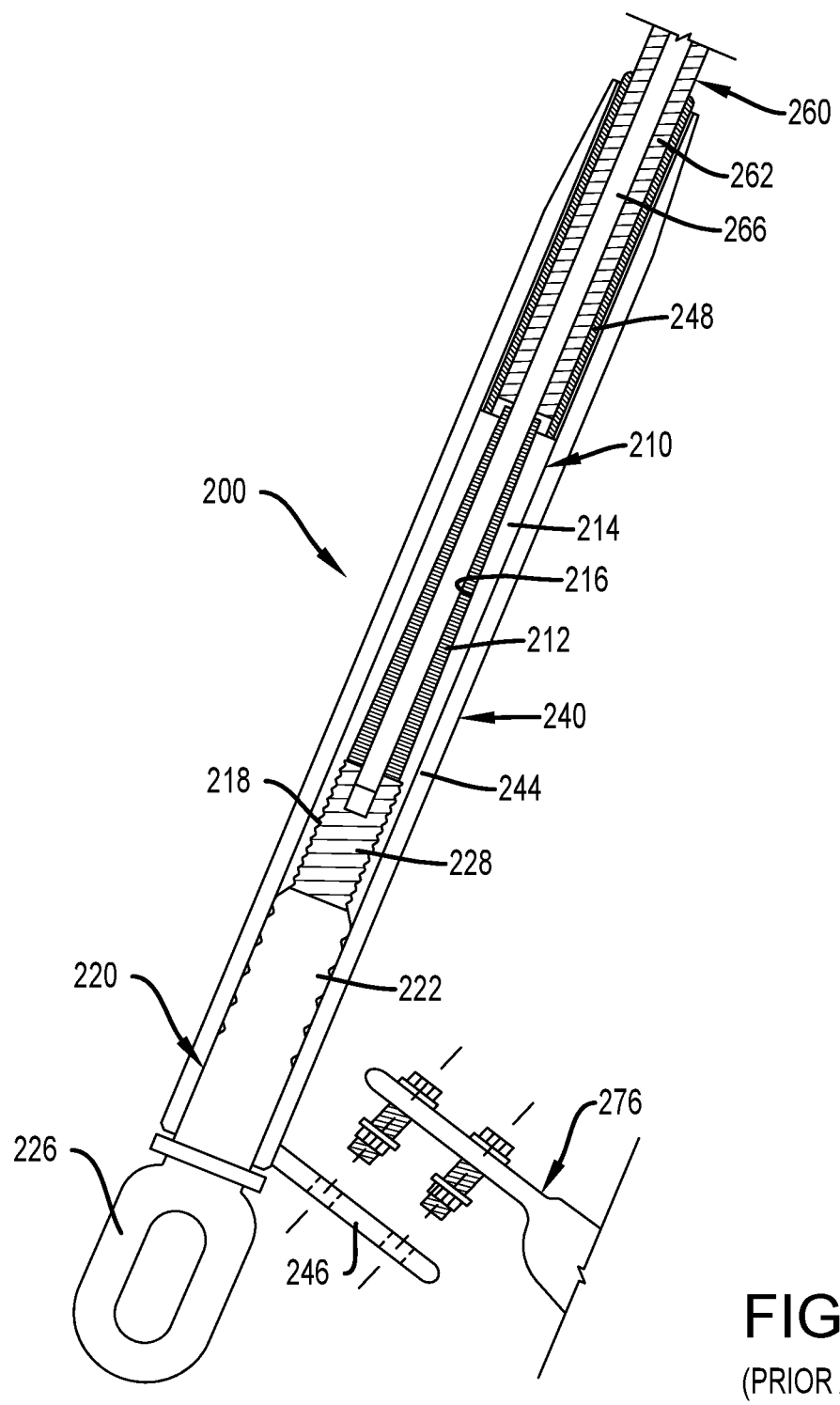
FIG. 2 illustrates a partial cross-section of a termination arrangement for an overhead electrical cable having a composite strength member according to the prior art.
Figure 3:
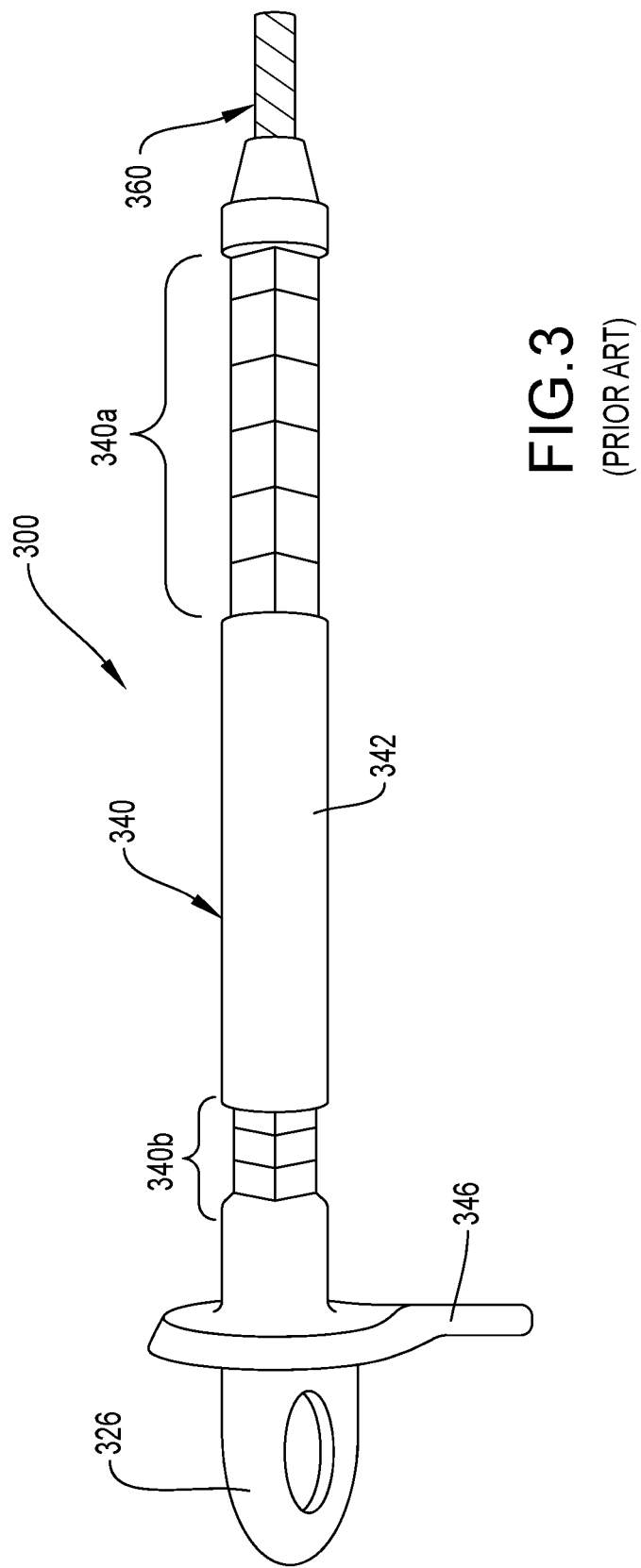
FIG. 3 illustrates a perspective view of a termination arrangement for an overhead electrical cable having a composite strength member according to the prior art.

During installation of the electrical line, the overhead electrical cable must be terminated and secured to the dead-end tower under high tension. Overhead electrical cables utilizing a steel or other ductile metal strength members can be attached to a termination arrangement by crimping the components surrounding the strength member using high compressive forces since the underlying strength member is ductile and will not fracture under the compressive stresses. Fiber-reinforced composite strength members, having a lower ductility and elongation to break than steel, are susceptible to being fractured under high compressive forces, and termination arrangements for such strength members are typically designed to reduce the compressive force on the strength member. FIGS. 2 to 4 illustrate two different termination arrangements that are particularly useful for overhead electrical cables having a fiber-reinforced composite strength member. FIG. 2 illustrates a cross-section of a termination arrangement (e.g., a dead-end) for use with a bare overhead electrical cable, i.e., to terminate an electrical cable while maintaining the cable under high tension. The termination arrangement 200 illustrated in FIG. 2 is similar to that illustrated and described in PCT Publication No. WO 2005/041358 by Bryant and in U.S. Pat. No. 8,022,301 by Bryant et al., each of which is incorporated herein by reference in its entirety.

Broadly characterized, the termination arrangement 200 illustrated in FIG. 2 includes a gripping element 210 that is secured to a connector 220, which anchors the termination arrangement 200 to a dead-end structure (e.g., to a tower), not illustrated, e.g., with a fastener 226 (e.g., an eyebolt). At the end of the termination arrangement 200, opposite the fastener 226, the termination arrangement 200 is operatively connected to a bare overhead electrical cable 260 that includes an electrical conductor 262 (e.g., comprising conductive strands) that surrounds and is supported by a strength member 266, e.g., a fiber-reinforced composite strength member.

The gripping element 210 tightly grips the strength member 266 to secure the overhead electrical cable 260 to the termination arrangement 200. As illustrated in FIG. 2, the gripping element 210 includes a compression-type fitting, specifically a collet 212 having a lumen 216 (e.g., a bore) that surrounds and grips onto the strength member 266. The collet 212 is disposed in a collet housing 214, and as the electrical cable 260 is tensioned (e.g., is pulled onto support towers), friction develops between the strength member 266 and the collet 212 as the collet 212 is pulled further into the collet housing 214. The conical (outer) shape of the collet 212 and the mating inner funnel shape of the collet housing 214 increase the compression on the strength member 266, ensuring that the strength member 264 does not slip out of the collet 212 and therefore that the overhead electrical cable 260 is secured to the termination arrangement 200.

As illustrated in FIG. 2, a conductive outer sleeve 240 is disposed over the gripping element 210 that includes a conductive body 244 to facilitate electrical conduction between the electrical conductor 262 and a jumper plate 246. An inner sleeve 248 (e.g., a conductive inner sleeve) may be placed between the conductor 262 and the conductive body 244 to facilitate the electrical connection between the conductor 262 and the conductive body 244. The inner sleeve 248 and the conductive body 244 may be fabricated from aluminum, for example. The jumper plate 246 is attached (e.g., welded) to the conductive body 244 and is configured to attach to a connection plate 276 to facilitate electrical conduction between the electrical conductor 262 and another conductor, e.g., another electrical cable (not illustrated) that is in electrical communication with the connector plate 276.

The connector 220 includes a fastener 226 and gripping element mating threads 228 disposed at a gripping element end of the connector 220, with a connector body 222 disposed between the fastener 226 and the gripping element mating threads 228. The gripping element mating threads 228 are configured to operatively mate with connector mating threads 218 on the collet housing 214 to facilitate movement of the connector 220 toward the collet 212 when the threads 218 and 228 are engaged and the connector 220 is rotated relative to the collet housing 214, pushing the collet 212 into the collet housing 214. This strengthens the grip of the collet 212 onto the strength member 266, securing the overhead electrical cable 260 to the termination arrangement 200. The fastener 226 is configured to be attached to a dead-end structure, e.g., to a dead-end tower, to secure the termination arrangement 200 and the electrical cable 260, to the dead-end structure.

After assembly of the termination arrangement, the outer sleeve may then be crimped (e.g., compressed, swaged) onto portions of the underlying structure to prevent movement of the outer sleeve and/or to enhance the connection between the conductive body and the electrical conductor. FIG. 3 illustrates a perspective view of a termination arrangement similar to that shown in FIG. 2 that has been crimped onto an overhead electrical cable. The termination arrangement 300 includes a connector having a fastener 326 that extends outwardly from a proximal end of an outer sleeve 340. A jumper plate 346 is integrally formed with the conductive body 342 for electrical connection to a connection plate (e.g., see FIG. 2). As illustrated in FIG. 3, the outer sleeve 340 is crimped over (e.g., onto) two regions of the underlying structure, namely crimped sleeve region 340b and crimped sleeve region 340a. Crimped sleeve region 340b is generally situated over the connector body (e.g., see 222 in FIG. 2), and the crimped sleeve region 340a is generally situated over a portion of the overhead electrical cable 360, e.g., to enhance the electrical connection to the electrical cable. The compressive forces placed onto the outer sleeve 340 during the crimping operation are transferred to the underlying components, i.e., to the connector body under the crimped region 340b and to the overhead electrical cable 360 under the crimped region 340a.

The foregoing termination arrangement utilizes a smooth surfaced collet 214 to grip onto the composite strength over a sufficient length such that points of high stress are generally avoided and the composite strength member is unlikely to fracture under the collet.

FIGS. 4A and 4B illustrate an alternative prior art termination arrangement 400 for use with composite strength members. For the sake of clarity, FIGS. 4A and 4B illustrate the relevant components of the termination arrangement, omitting the outer sleeve, jumper plate, etc. illustrated in FIGS. 2 and 3. Rather than using a tapered collet to grip the strength member, the termination arrangement illustrated in FIGS. 4A and 4B is secured to the strength member by radial compression (e.g., crimping, swaging) of the connector body onto the strength member using a crimping tool, e.g., using a hydraulic press. The arrangement 400 includes a steel connector 420 having a connector body 422 and a fastener 426 (e.g., an eyebolt). An inner sleeve 432 of aluminum, which is softer than the surrounding steel connector body 422, is placed between the composite strength member 466 and the connector body 422. The crimping operation typically includes sequentially crimping the connector body with a crimping tool beginning at the proximal end. i.e., near the fastener 426, and working toward the distal end. The crimping tool may apply up to about 100 tons of compressive force to the connector body 422 to secure the connector body to the strength member 466. The inner aluminum sleeve 432 is intended to redistribute a portion of this radial crimping force so that the force on the strength member 466 is reduced.

When the connector body 422 is crimped onto the underlying inner aluminum sleeve 432 and strength member 466 as illustrated in FIG. 4B, the sleeve 432 and body 422 elongate due to the crimping force, e.g., from initial length (FIG. 4A) to an expanded length $l_2$ (FIG. 4B). When this elongation occurs, the aluminum sleeve 432 is expected to slide over the strength member 466 as the sleeve 432 elongates, imparting little to no elongation strain onto the strength member. For example, crimping the connector body 422 may elongate the aluminum sleeve 432 by up to about 5%, substantially higher than the strain to failure limit of the underlying composite strength member 466, which is typically less than 2%. However, it has been found that the aluminum sleeve 432 may "pull" the underlying strength member 466, e.g., due to frictional forces, such that the strength member 466 elongates with the sleeve 432, which subjects the strength member to a high elongation (e.g., tensile) strain. If the elongation strain is too high, the strength member 466 may fracture (e.g., fracture 466f) due to the lower elongation properties of the composite strength member 466.

It is an objective to provide a termination arrangement that reduces the amount of elongation strain on the strength member caused by the crimping of the surrounding components. In the embodiments of this disclosure, the elongation strain on the strength member is reduced or substantially eliminated by placing a high tensile modulus sheath, e.g., a hard steel sheath, over the strength member. The steel sheath is then compressed onto the strength member by crimping a connector body and/or crimping a conductive sleeve onto the steel sheath. The properties of the sheath, e.g., the material from which the sheath is fabricated and/or the wall thickness of the sheath, protects the strength member from being subjected to tensile strains that may damage the strength member, and the sheath may be referred to as a tensile strain sheath. Although generally described herein as a steel sheath, the tensile strain sheath may be fabricated from other high tensile modulus materials, e.g., materials having a higher tensile modulus than aluminum. In addition to steel (e.g., hardened steel), the sheath may also be fabricated from materials such as high tensile modulus composites, e.g., carbon fiber, boron fiber or ceramic fiber in a matrix such as a thermosetting polymer matrix, a thermoplastic polymer matrix, or a metal matrix. In one characterization, the tensile strain sheath is fabricated from a material having a tensile modulus of at least about 125 GPa, such as at least about 150 GPa, or even at least about 175 GPa.

Figure 5A:
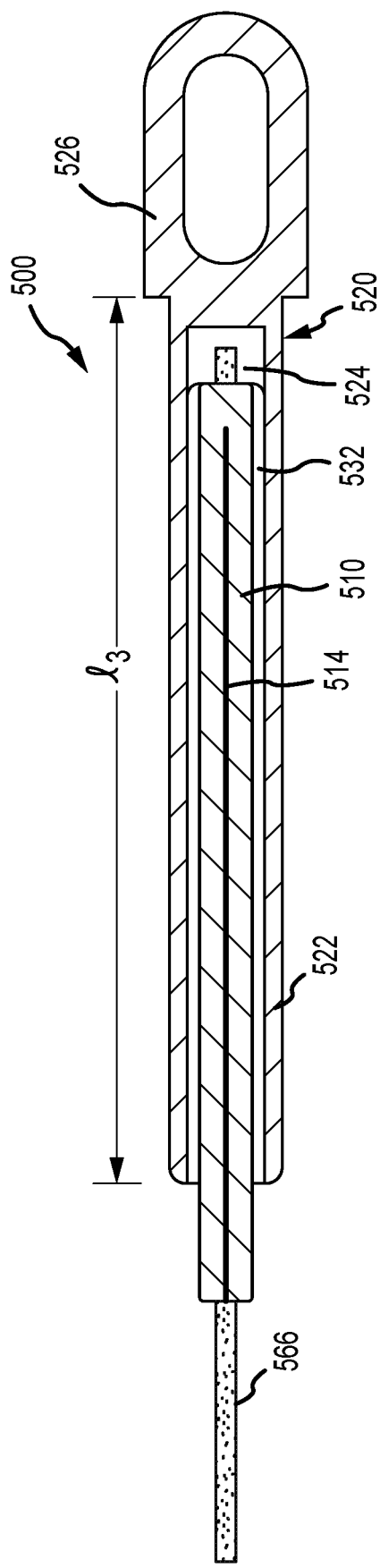
FIGS. 5A and 5B illustrate an embodiment of a termination arrangement according to the present disclosure.
Figure 5B:
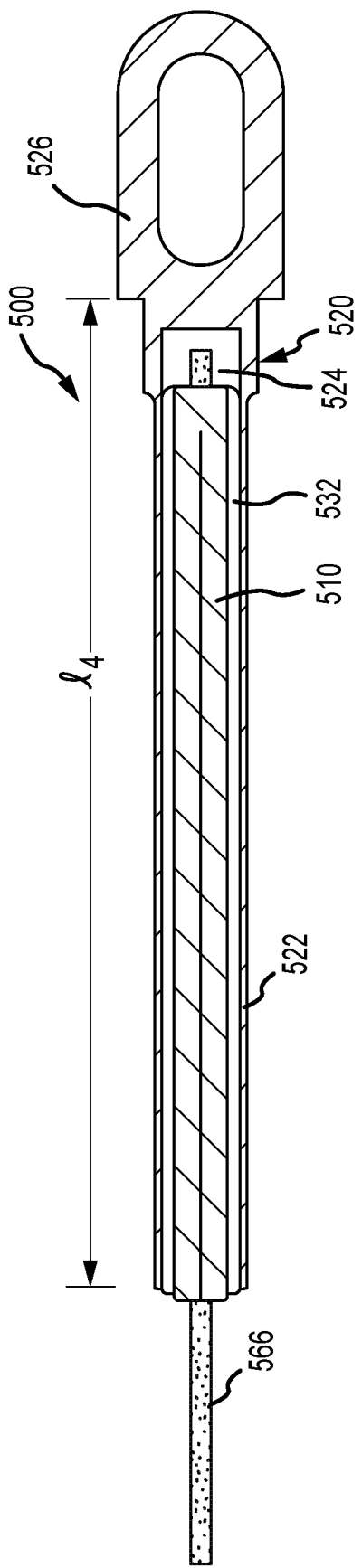

FIGS. 5A and 5B illustrate one embodiment of a termination arrangement according to the present disclosure. The termination arrangement 500 is configured for securing an overhead electrical cable that includes a strength member and an electrical conductor (e.g., conductive strands) disposed around the strength member. Broadly characterized, the termination arrangement includes a sheath (e.g., a steel sheath) that operatively surrounds the strength member of the overhead electrical cable to reduce elongation strain on the strength member.

Referring to FIGS. 5A and 5B, the termination arrangement 500 includes a connector 520 having a connector body 522 and a fastener 526. The connector body 522 defines an internal cylindrical chamber 524 for receiving the strength member 566 therein. A steel sheath 510, optionally having one or more slits 514, is placed over the strength member 566 so that the sheath 510 is disposed between the strength member 566 and the connector body 522. In the embodiment illustrated in FIGS. 5A and 5B, an inner sleeve 532, e.g., an aluminum sleeve that is softer than the connector body 522 and the sheath 510, is placed between the steel sheath 510 and the connector body 522.

FIG. 5A illustrates the termination arrangement 500 in an uncrimped state, e.g., before the connector body 522 is crimped onto the underlying aluminum inner sleeve 532, steel sheath 510 having one or more slits 514, and strength member 566. Before crimping, the connector body has an initial length $l_3$. FIG. 5B illustrates the termination arrangement 500 after crimping the connector body 522 onto the underlying components. The crimping process involves using a crimping tool to compress a portion of the connector body 522, working from the distal end of the connector body 522, i.e., adjacent to the fastener 526, toward the opposite end until the connector body 522 is crimped along its length overlying the sleeve 532 and sheath 510, e.g., as illustrated in FIG. 5B. As with the embodiment shown in FIG. 4B above, the connector body elongates due to the crimping strain to an expanded length $l_4$, as does the aluminum sleeve 532. However, the underlying steel sheath 510 substantially resists elongation and therefore limits the elongation of the strength member 566, e.g., to a point substantially below that required to fracture the strength member 566. In one characterization, the steel sheath 510 is formed from a steel that is harder than the steel used to form the connector body 522. In this configuration, the harder steel sheath will be less likely to elongate during the crimping procedure. In another characterization, additional resistance to elongation can be achieved by increasing the cross-sectional area, e.g., the wall thickness, of the steel sheath.

Figure 6A:
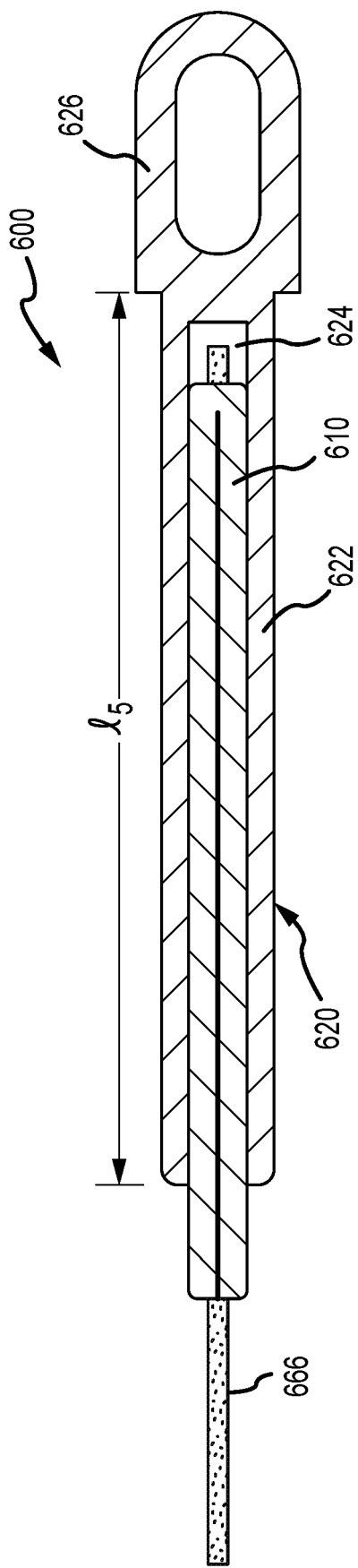
FIGS. 6A and 6B illustrate an embodiment of a termination arrangement according to the present disclosure.
Figure 6B:
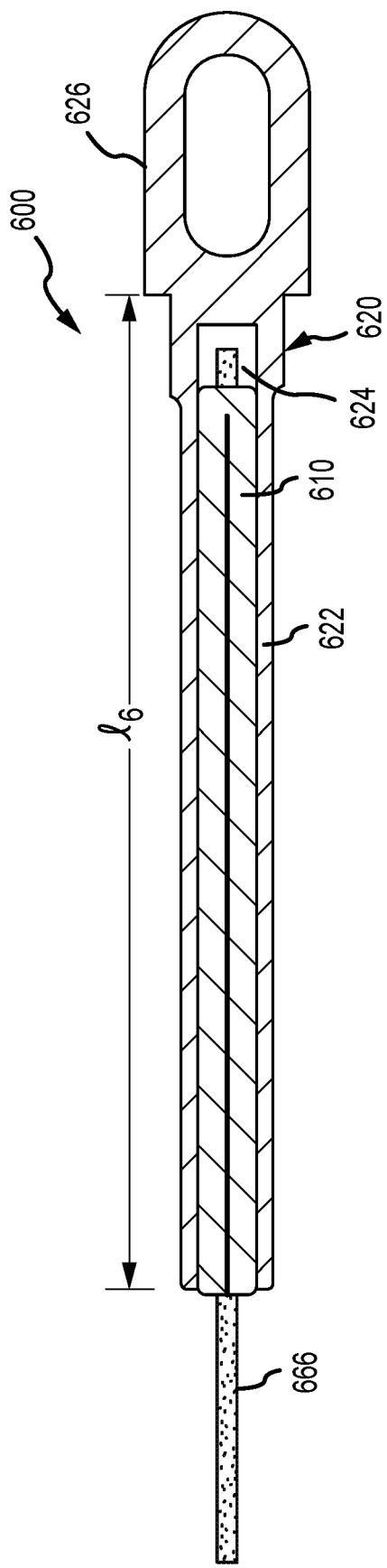

FIGS. 6A and 6B illustrate another configuration of a termination arrangement 600 according to the present disclosure. The termination arrangement includes a connector 620 having a connector body 622 and a fastener 626. The connector body 622 defines a cylindrical space 624 for receiving the strength member 666 therein. A steel sheath 610 having one or more slits 614 is placed over the strength member 666 so that it is disposed between the strength member 666 and the connector body 622.

FIG. 6A illustrates the termination arrangement 600 in an uncrimped state, e.g., before the connector body 622 is crimped onto the underlying steel sheath 610 and strength member 666. Before crimping, the connector body has an initial length $l_5$. FIG. 6B illustrates the termination arrangement 600 after crimping the connector body 622 onto the underlying components as is described above. The connector body 622 elongates due to the crimping strain to an expanded length $l_6$. However, the underlying steel sheath 610 does not elongate to a substantial degree and therefore does not cause the strength member 666 to elongate to a point that would fracture the strength member 666. The embodiment illustrated in FIGS. 6A and 6B show that an inner aluminum sleeve (e.g., sleeve 532 in FIG. 5A) is not necessary to adequately protect the strength member 666 from the crimping forces and from elongation forces.

Referring to FIGS. 7A to 7E, one embodiment of a steel sheath 710 is illustrated, e.g., a sheath that may be utilized in the termination arrangements illustrated in FIGS. 5 and 6.

The sheath 710 has an outer diameter ($d_o$) and a length ($l_7$) and includes a bore 712 having an inner diameter ($d_i$). The inner diameter of the bore 712 is configured (e.g., shaped and sized) to enable a strength member to be inserted into the bore 712, e.g., to be inserted into the bore 712 through a first end 716a of the sheath and out a second end 716b of the sheath. The inner diameter should be sufficiently large to enable the strength member to be inserted through the bore 712 (e.g., with only moderate friction against the sidewall of the bore). However, the diameter of the bore 712 should not be so great that the strength member is able to move axially within the bore when the one or more slits are approaching contact, e.g., are closing. In one characterization, bore 712 has a diameter of at least about 2.5 mm. In another characterization, the bore has a diameter of not greater than about 15 mm.

The outer diameter $d_o$ of the sheath 710 should be sufficiently large that the sheath may be fit within the cylindrical space defined by the connector body without a significant gap between the sheath and the inner wall of the connector body (FIG. 6A), or within the aluminum sleeve (FIG. 5A). In one characterization, the outer diameter $d_o$ is at least about 5 mm. In another characterization, the outer diameter $d_o$ is not greater than about 46 mm.

The length $l_7$ of the sheath 710 should be long enough to ensure that a sufficient length of the strength member is disposed within the sheath to form a sufficient grip on the strength member after crimping without having points of high stress concentration. For example, the sheath 710 may have a length $l_7$ of at least about 100 mm. Typically, the length $l_7$ will not exceed about 300 mm. In another characterization, the sheath 710 has an outer diameter $d_o$ and a length $l_7$, and the length is at least 10 times greater than the outer diameter, such as at least about 15 times greater than the outer diameter, such as at least about 20 times greater than the outer diameter. In a further characterization, the length is not greater than about 50 times the outer diameter, such as not greater than about 40 times the outer diameter. However, smaller diameter strength members, e.g., having a diameter of about 3 mm or less, may benefit from the use of a sheath 710 having a length that is near or slightly more than 50 times the outer diameter.

The sheath 710 also has a wall thickness, e.g., the difference between the outer diameter $d_o$ and the inner diameter $d_i$ of the sheath. The wall thickness of the sheath 710 should be sufficient to limit axial tension forces. In one characterization, the wall thickness of the sheath 710 is at least about 3 mm. In another characterization, the wall thickness of the sheath is not greater than about 20 mm. As is noted above, increasing the wall thickness of the sheath may increase the resistance to elongation.

As illustrated in FIGS. 7A to 7E, the sheath 710 includes two longitudinally extending slits (e.g., slit 714a) that are disposed through a first end 716a of the sheath and extend toward a second end 716b of the sheath, e.g., without extending through the second end 716b. These two slits are disposed on opposite sides of the sheath 710, e.g., at a radial angle of about 180°. The sheath 710 also includes two slits (e.g., slit 714b) that are disposed through the second end 716b and extend toward the first end 716a of the sheath, e.g., without extending through the first end 716a. These longitudinally extending slits advantageously enable the sheath 710 to accommodate variations in the strength member diameter, and to enable the sheath 710 to resist axial tension forces while providing minimal restriction to closure of the sheath onto the strength member when crimped. Although illustrated as including four longitudinally extending slits, the sheath may include a single slit, two slits, three slits or more. The interior surface of the sheath 710 (e.g., the surface of the bore 712) may be smooth or may have surface features to enhance the grip of the sheath 710 onto the strength member. For example, the interior surface may have grit applied to the surface or may be machined to provide surface texture, e.g., small ridges on the surface. Further, although not illustrated, the sheath may be slightly tapered from one end to the other, e.g., where the outer diameter of the sheath changes along the length of the sheath.

Figure 8C:
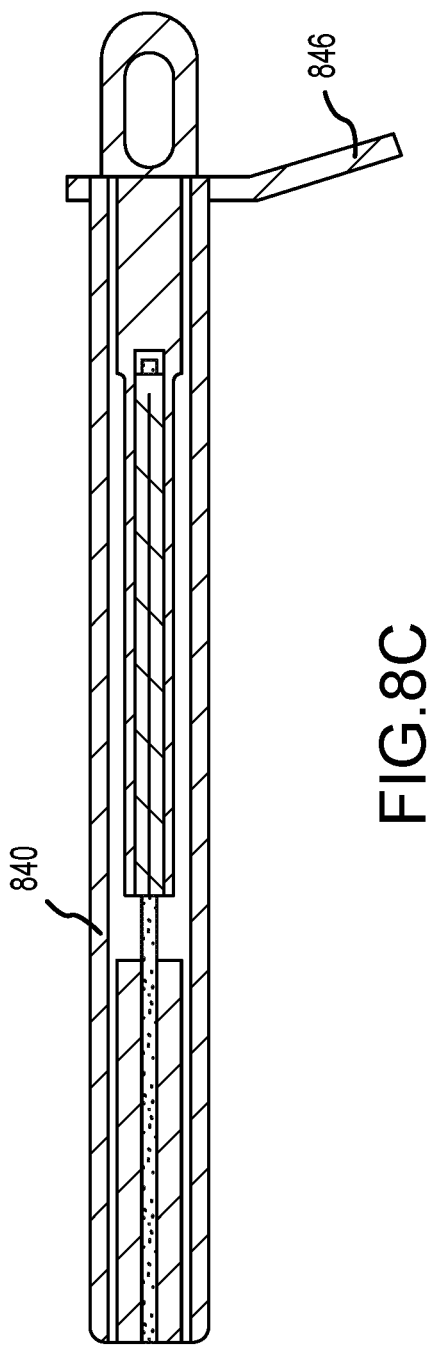
Figure 8D:
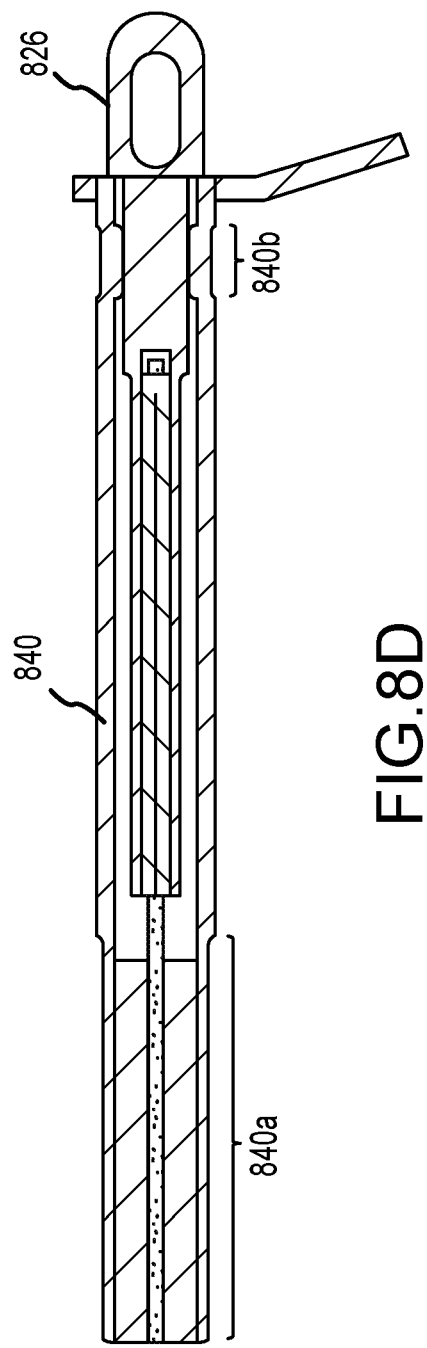

FIGS. 8A and 8B illustrate a schematic cross-sectional view of a termination arrangement 800 according to the present disclosure before placement and crimping of an outer sleeve 840. FIGS. 8C and 8D illustrate a schematic cross-sectional view of the termination arrangement 800 after placement of the outer sleeve 840 (FIG. 8C) and crimping of the outer sleeve 840 (FIG. 8D). The termination arrangement 800 includes a longitudinally-extending steel sheath 810 having a central sheath bore extending therethrough, e.g., from one end of the sheath 816a through the opposite end 816b of the sheath. In this manner, an end portion of the strength member 864 is disposed within the sheath 810.

A connector 820 (e.g., a steel connector) includes a fastener 826 disposed at a first end of the connector 820 and a connector body 822 that extends from the fastener 826 toward a second end of the connector 820. The second end of the connector includes an axial bore 824 that is configured (e.g., sized and shaped) to receive and end of the strength member 864. Thus, as illustrated in FIG. 8A, the electrical cable 860 is stripped of a portion of the electrical conductor 862 to expose the underlying strength member 864. The exposed strength member is then inserted into the sheath 810, which is placed within the axial bore 824 of the connector 820. As illustrated in FIG. 8B, a portion 828 of the connector body 822, e.g., the portion including the axial bore 824, is crimped (e.g., compressed, swaged) onto the sheath 810, which compresses onto the strength member 864 to secure the connector 820 to the strength member 864.

As illustrated in FIG. 8C, the outer sleeve 840 can then be placed over the termination arrangement 800 illustrated in FIG. 8B. Once the outer sleeve 840 is in place over the termination arrangement 800, the sleeve 840 may be crimped onto the sub-assembly and the electrical cable 860 as shown in FIG. 8D. The outer sleeve 840 is crimped at two locations, namely a first portion 840a over the electrical cable and a second portion 840b over the connector body 822.

As noted above, the overhead electrical cable 860 may be configured for the transmission and/or distribution of electricity when placed on support towers (e.g., pylons). In one arrangement, the conductor 862 comprises one or more layers of aluminum strands wrapped (e.g., helically wrapped) around the strength member 864. In another arrangement, the strength member 864 includes longitudinally-extending reinforcing fibers (e.g., high strength carbon fibers) in a binding matrix (e.g., in an epoxy resin or thermoplastic matrix).

FIGS. 9A to 9D illustrate an alternative embodiment of a termination arrangement according to the present disclosure. Specifically, FIGS. 9A and 9B illustrate a perspective view and a cross-sectional view respectively of the termination arrangement 900 before crimping, and FIGS. 9C and 9D illustrate a cross-sectional view and a perspective view respectively of the termination arrangement 900 after crimping. The termination arrangement 900 includes a longitudinally-extending steel sheath 910 having a central sheath bore 912 extending therethrough, e.g., from one end 916a (e.g., a distal end) of the sheath through the opposite end 916b (e.g., a proximal end) of the sheath and at least one or more slits. In this manner, a portion 964b of the strength member 964 is disposed within the sheath 910.

A connector 920 (e.g., a steel connector) includes a fastener 926 disposed at a first end of the connector 920 and a connector body 922 that extends from the fastener 926 toward a second end of the connector 920. The second end of the connector includes a notch 924 that is configured to receive an end of the strength member 964. A conductive outer sleeve 940 is disposed over the sheath 910, e.g., in a position where the outer sleeve 940 can be crimped onto the sheath 910, e.g., to compress the sheath 910 onto the strength member 964. As illustrated in FIGS. 9C and 9D, the outer sleeve 940 is crimped along substantially its entire length (e.g., at least about 80% or 90% of its length), such that the outer sleeve 940 is crimped onto the connector body 922 and is crimped onto a portion of the overhead electrical cable 960 in addition to being crimped onto the sheath 910.

Example

To assess the effectiveness of the termination arrangement according to the present disclosure, two overhead electrical cables including fiber-reinforced composite strength members having a diameter of 7.11 mm are tested during compression swaging (e.g., crimping) of dead-end termination assemblies onto the strength members. One of the termination arrangements is according to the prior art (e.g., as illustrated in FIGS. 4A-4B), and a second termination arrangement includes a steel sheath (e.g., as illustrated in FIGS. 6A-6B).

Figure 10:
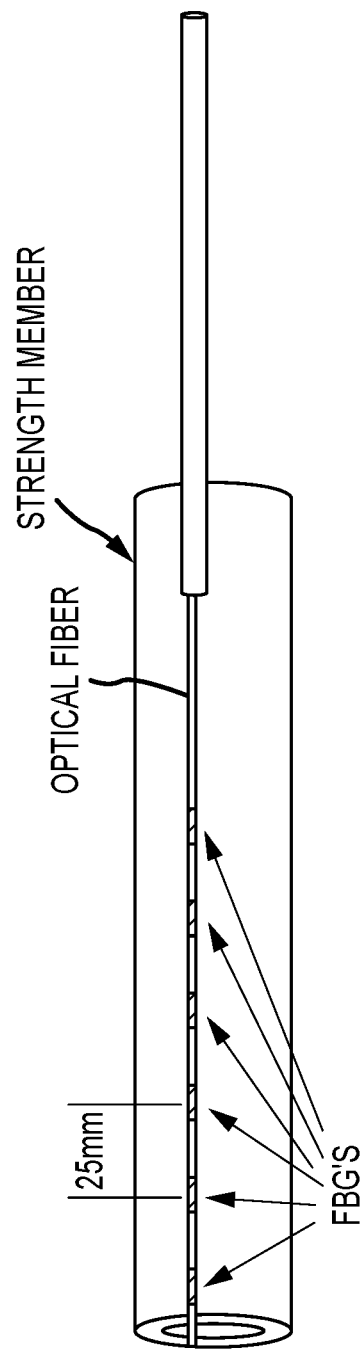
FIG. 10 schematically illustrates a method for measuring the strain placed on a composite strength member during crimping.

To measure the strain on the strength member during the crimping process, a single optical fiber is placed along the outer surface of each of the two strength members. As illustrated in FIG. 10, the optical fiber includes six Fiber Bragg Gratings (FBG), each about 7 mm in length and evenly spaced about 18 mm apart, resulting in a center to center spacing of about 25 mm. The eyebolt of a dead-end is compression swaged (crimped) onto the composite strength members including the FBGs following the same procedure and using the same equipment that is used in a field attachment.

The strain measured by the FBG's is monitored continuously during the crimping procedure. The numbering sequence of the FBG's was such that FBG #6, which is closest to the eyebolt, is the first to experience crimping forces followed by FBG #5 down to FBG #1. The typical pattern is that FBG #6 does not experience significant levels of axial strain with the subsequent FBG's building up higher levels of axial strain. Modeling of the arrangements indicates that as the radial compaction occurs a substantial amount of plastic deformation also occurs. If this axial deformation is not relieved by slippage of the crimping metal over the composite strength member, the strains may be large enough to exceed the 1.9% maximum elongation of the composite strength member.

The foregoing testing and analysis finds that a termination arrangement including a steel sheath according to the present disclosure reduces axial strain considerably while allowing full radial compression for gripping of the composite strength member. Specifically, the peak strain in the standard assembly according to the prior art reaches 1.2% in FBG #5, whereas the peak strain in the composite strength member protected by the steel sheath is reduced to 0.52%, with this peak strain also occurring in FBG #5.

While various embodiments of a termination arrangement and method for terminating an overhead electrical cable have been described in detail, it is apparent that modifications and adaptations of those embodiments will occur to those skilled in the art. However, it is to be expressly understood that such modifications and adaptations are within the spirit and scope of the present disclosure.

What is claimed is:

1. A termination arrangement for securing an overhead electrical cable comprising a strength member and an electrical conductor disposed around the strength member, the termination arrangement comprising:
   a steel connector comprising a fastener disposed at a first end of the connector and a connector body extending from the fastener toward an end of the connector that lies opposite the fastener, wherein the connector body comprises a longitudinally-extending internal chamber that is accessible through a chamber inlet;
   a longitudinally-extending sheath having a tensile modulus of at least about 125 GPa and comprising a central bore extending through the length of the sheath that is configured to receive a strength member within the central bore, where the internal chamber of the connector body is configured to operatively receive the sheath therein when the termination arrangement is assembled; and
   a conductive sleeve configured to be disposed over: (i) an end of the electrical cable, (ii) the sheath, and (iii) at least a portion of the connector body when the termination arrangement is operatively assembled.

2. The termination arrangement recited in claim 1, wherein the sheath is fabricated from steel.

3. The termination arrangement recited in claim 1, wherein the central bore has a substantially circular cross-section.

4. The termination arrangement recited in claim 1, wherein the central bore has a bore surface that is substantially smooth.

5. The termination arrangement recited in claim 1, wherein the central bore has a bore surface comprising surface features that are configured to improve the grip of the sheath onto the strength member when the sheath is operatively placed over the strength member.

6. The termination arrangement recited in claim 5, wherein the surface features are selected from surface grit and surface scoring.

7. The termination arrangement recited in claim 1, wherein the sheath has an outer diameter and a length, and wherein the length is at least 20 times greater than the outer diameter.

8. The termination arrangement recited claim 1, wherein the sheath has an outer diameter and a length, and wherein the length is not greater than about 30 times greater than the outer diameter.

9. The termination arrangement recited in claim 1, wherein the sheath comprises at least a first longitudinal slit through a first end of the sheath and extending toward a second end of the sheath.

10. The termination arrangement recited in claim 9, wherein the sheath comprises at least a second longitudinal slit through the second end of the sheath and extending toward the first end of the sheath.

11. The termination arrangement recited in claim 10, wherein the sheath comprises at least a third longitudinal slit through the first end of the sheath and extending toward the second end of the sheath.

12. The termination arrangement recited in claim 11, wherein the slits are disposed around the sheath in a substantially equidistant manner.

13. The termination arrangement recited in claim 1, further comprising an aluminum sleeve that is configured to be disposed in the internal chamber and between a chamber wall and the steel sheath when the termination arrangement is operatively assembled.

14. The termination arrangement recited in claim 1, wherein the conductive sleeve is formed from aluminum.

15. A termination arrangement secured to an overhead electrical cable, the overhead electrical cable comprising a fiber-reinforced composite strength member and an electrical conductor disposed around the composite strength member, the termination arrangement comprising:
- a steel connector comprising a fastener disposed at a first end of the connector and a connector body extending from the fastener toward an end of the connector that lies opposite the fastener, wherein the connector body comprises a longitudinally-extending internal chamber that is accessible through a chamber inlet at the end opposite the fastener;
- a longitudinally-extending sheath having a tensile modulus of at least about 125 GPa and comprising a central bore extending through the entire length of the sheath and that is operatively disposed over and compressed onto a portion of the strength member to operatively grip the strength member; and
- a conductive sleeve that is disposed over (i) an end of the electrical cable, (ii) the sheath, and (iii) at least a portion of the connector body;
- wherein the sheath is operatively attached to the connector body by being disposed within the longitudinally-extending chamber and having the connector body crimped onto the sheath.

16. The termination arrangement recited in claim 15, wherein the composite strength member comprises longitudinally-extending reinforcing fibers in a plastic binding matrix.

17. The termination arrangement recited in claim 16, wherein the reinforcing fibers comprise fibers selected from the group consisting of carbon fibers, glass fibers, ceramic fibers and combinations thereof.

18. The termination arrangement recited in claim 15, wherein the sheath is formed from a material selected from the group consisting of steel and a fiber-reinforced composite.

19. The termination arrangement recited in claim 15, wherein the sheath is fabricated from steel and wherein the steel sheath comprises at least a first longitudinally extending slit through a first end of the steel sheath and toward a second end of the steel sheath.

20. The termination arrangement recited in claim 19, wherein the steel sheath comprises at least a second longitudinally extending slit through the second end of the steel sheath and toward the first end of the steel sheath.

21. The termination arrangement recited in claim 15, wherein an aluminum sleeve is disposed between the connector body and the sheath.

22. The termination arrangement recited in claim 15, wherein the connector body is crimped onto the sheath along substantially the entire length of the sheath.

23. The termination arrangement recited in claim 15, wherein the conductive sleeve is formed from aluminum.

24. The termination arrangement recited in claim 15, wherein the fiber-reinforced composite strength member includes a single strength element comprising reinforcing fibers in a plastic binding matrix.

25. A method for the termination of an overhead electrical cable comprising a fiber-reinforced composite strength member and an electrical conductor disposed around the fiber-reinforced strength member, the method comprising the steps of:
- removing the electrical conductor from a termination end of the overhead electrical cable to expose an end portion of the fiber-reinforced composite strength member;
- placing the exposed end portion of the fiber-reinforced composite strength member through a central bore disposed within a longitudinally extending steel sheath;
- operatively attaching the steel sheath to a connector, the connector comprising a fastener disposed at a first end of the connector and a connector body extending from the fastener toward an end of the connector that lies opposite the fastener, the attaching comprising disposing the sheath within a chamber in the connector body and crimping the connector body onto the steel sheath; and
- disposing a conductive sleeve over: (i) an end of the electrical cable, (ii) the steel sheath, and (iii) at least a portion of the connector body.

26. The method recited in claim 25, wherein the fiber-reinforced composite strength member includes a single strength element comprising reinforcing fibers in a plastic binding matrix.

\* \* \* \* \*